May 30, 1961  R. J. CERNY  2,986,038
WRIST PRESSURE GAUGE
Filed July 31, 1958  3 Sheets-Sheet 1

INVENTOR.
R. J. CERNY
BY
B. L. Zangwill
ATTORNEYS.

May 30, 1961 R. J. CERNY 2,986,038
WRIST PRESSURE GAUGE
Filed July 31, 1958 3 Sheets-Sheet 2

INVENTOR.
R. J. CERNY
BY
B. L. Zangarell
ATTORNEYS.

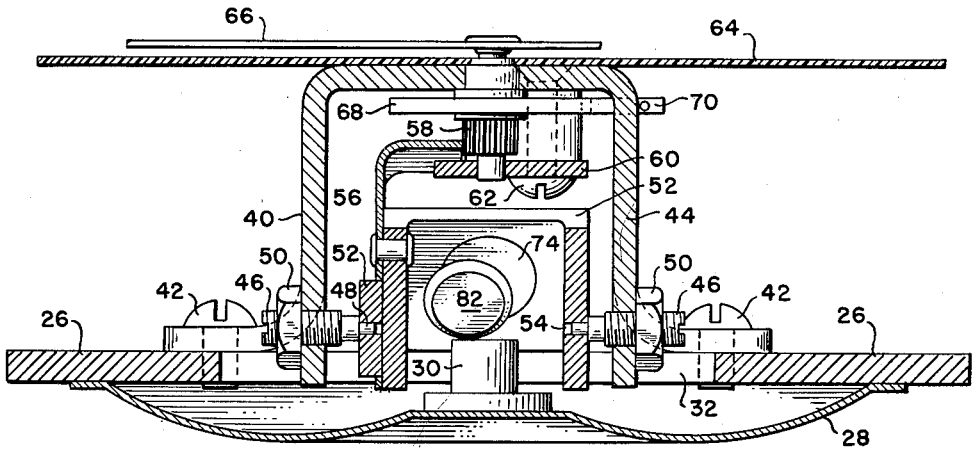
FIG. 4.
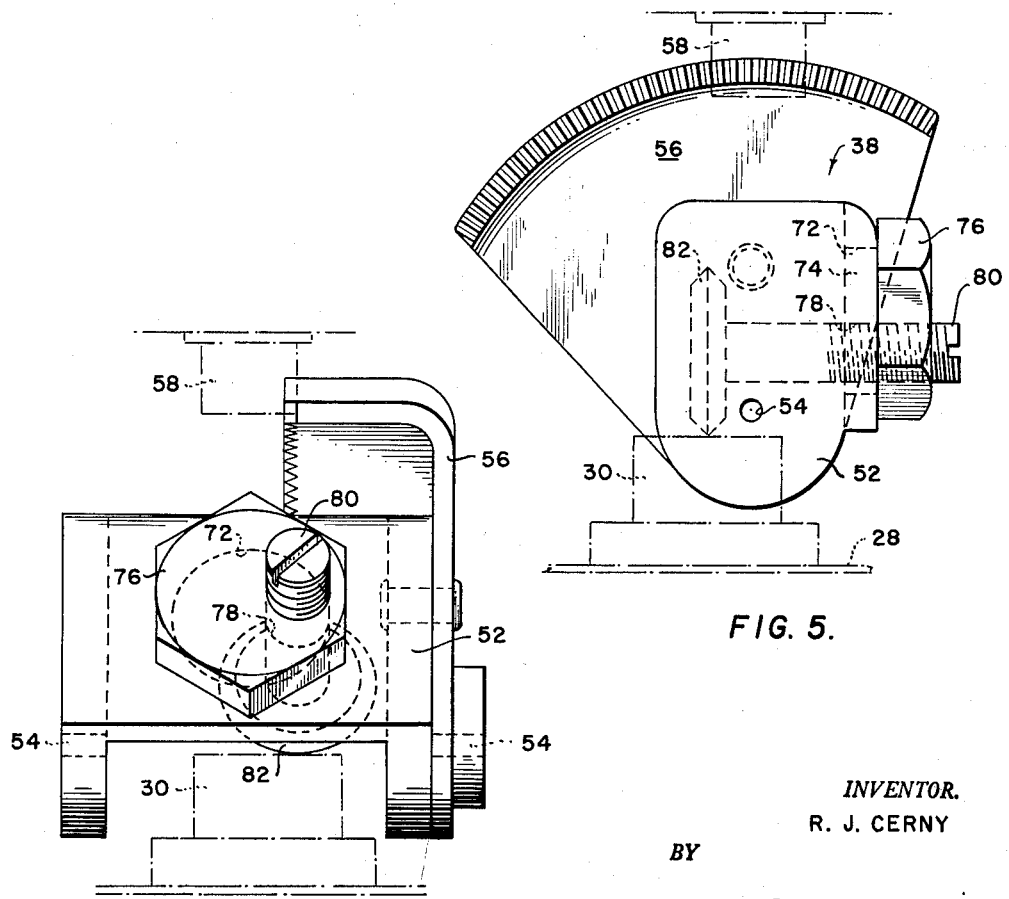
FIG. 5.
FIG. 6.
INVENTOR.
R. J. CERNY under# United States Patent Office 2,986,038
Patented May 30, 1961

2,986,038
WRIST PRESSURE GAUGE

Rudolph J. Cerny, Timonium, Md., assignor, by mesne assignments, to the United States of America as represented by the Secretary of the Navy Filed July 31, 1958, Ser. No. 752,387

3 Claims. (Cl. 73—406)

The invention relates to a pressure responsive gauge and more particularly a pressure responsive gauge having an air tight casing and including mechanism whereby the calibration thereof may be adjusted.

With the rapidly growing activity in the field commonly known as skin-diving and allied deep sea diving activities, there is a growing need for a light weight, portable, accurate and readily calibrated depth, pressure gauge, and more particularly one that is adapted to be worn on the wrist. Prior art attempts at solving this problem have been rather limited in nature although there have been numerous types of depth gauges constructed in the past, most of which have been extremely complicated in construction, frequently including a great number of linkage members and other mechanism that is easily susceptible to breakage and loss of adjustment. Few, if any pressure gauges have in the past provided means whereby the calibration thereof may be adjusted at the outset, and should such adjustment fail in the future, provide means whereby the gauge may be readjusted. Furthermore, most gauges are of the aneroid type, utilizing a bellows or the like having a quantity of air sealed therein. Such devices have the shortcoming of losing their calibration over a period of time due to the fact that the bellows member frequently goes out of adjustment due to the repeated flexing thereof due to changes in pressure; such devices have a further shortcoming in that they require temperature compensation for the air trapped within the bellows. Thus there is a need for a depth pressure gauge that is simple in construction, easily calibrated, substantially free of loss of calibration with use, and yet is relatively small in size so that it may be worn on the wrist in the same manner as a wrist watch.

In accordance with this invention, the pressure gauge comprises a casing member, a pressure sensitive diaphragm fixedly attached to the bottom of the casing, a pressure indicating dial face and mechanism within the casing adapted to translate diaphragm movement to a moveable pointer cooperatively mounted on the dial face so as to give a pressure reading on the dial of the instrument. The mechanism within the pressure gauge comprises a pivotally mounted gear sector in driving connection with a pinion attached to the pointer; a lever-like member has one end thereof fixedly attached to the gear sector and a free end in contact with a stud mounted on the diaphragm, whereby movement of the diaphragm causes the free end of said lever to move with ensuing movement of the gear sector, pinion and dial pointer. A suitable spring means is provided for restoring the dial pointer to zero when pressure is removed from the diaphragm.

It is accordingly an object of this invention to overcome the aforementioned disadvantages found in the prior art.

It is another object of this invention to provide a pressure gauge that is simple in construction, light in weight and substantially fool proof.

An additional object of this invention is to provide a pressure gauge having means whereby the calibration thereof may be adjusted.

Still another object of this invention is to provide a pressure gauge that eliminates the need for temperature compensations.

A further object of this invention is to provide a pressure gauge adapted, within the limits of its range, to give a substantially linear visual indication of various depth.

Other objects of the invention and many attendant advantages thereof will be apparent from the following description considered in conjunction with the accompanying drawings wherein:

Fig. 4 is a sectional view taken on line IV—IV of Fig. 2;

Fig. 5 is an enlarged view of a portion of the structure shown in Fig. 3, shown in the position taken thereby when the gauge is subjected to maximum pressure; and Fig. 6 is an enlarged view of the sector assembly shown in Fig. 3, looking from the right.

Figure 1:
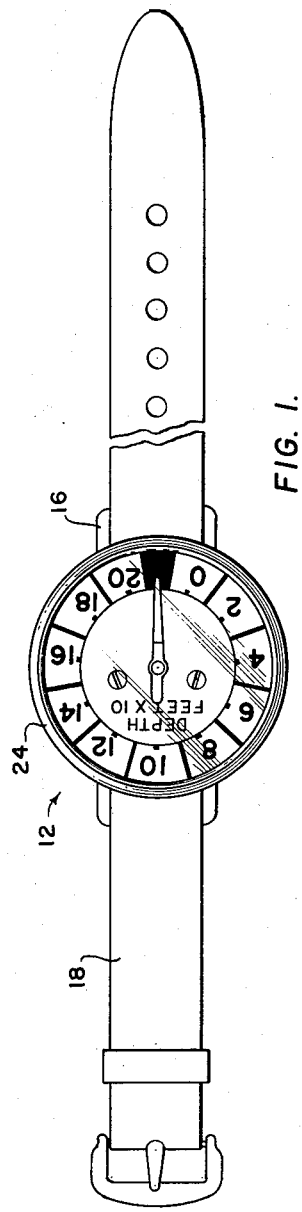
Fig. 1 is a plan view of the instant invention.
Figure 2:
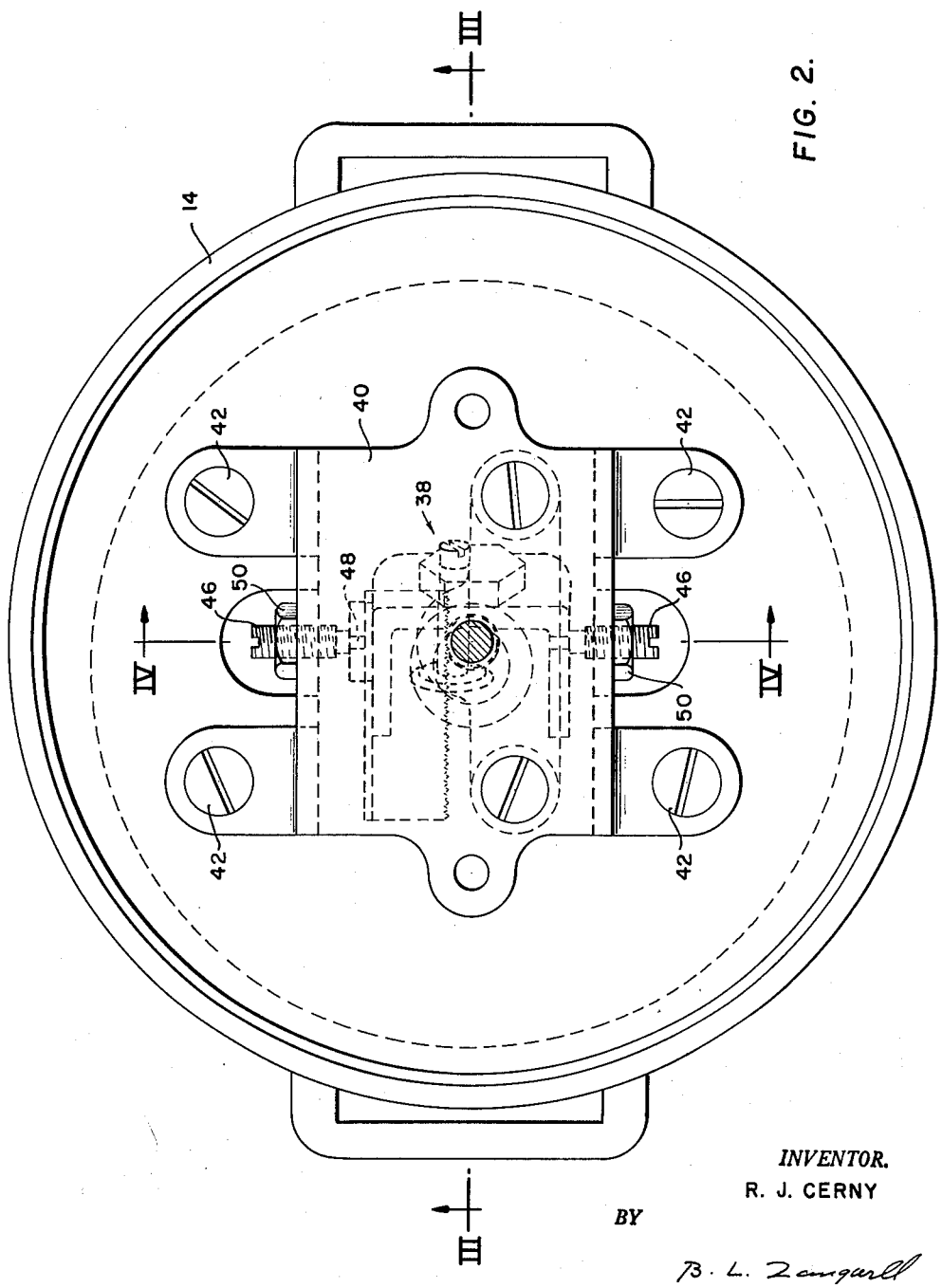
Fig. 2 is a plan view, partially in section and partially broken away of the instant invention with the dial face pointer and dial cover glass removed.

Referring to the drawings wherein like reference characters designate like or corresponding parts throughout the several views, there is shown in Fig. 1 a plan view of a pressure gauge 12 produced in accordance with this invention. It is emphasized that the instant invention is, though need not necessarily be, only slightly larger than a conventional wrist watch and is adapted to be worn on the wrist of a diver.

The pressure gauge 12 comprises an annular case 14, a bottom plate 16 adapted to receive a wrist strap 18 and having openings 20 therein through which water is adapted to pass, and a cover glass 22 extending over the top of the case 14 and connected thereto in watertight relation therewith. A rubber bezel guard 24 surrounds the upper end of the case 14 and guards the cover glass 22.

The gauge 12 further comprises a movement supporting plate 26 located within a recessed area at the bottom of the case 14 and attached thereto in watertight relation therewith by solder or the like. The movement supporting plate 26 has attached to its outer face, a pressure responsive diaphragm 28 that is substantially disk like in form and which is attached along its outer periphery to the movement supporting plate 26 in watertight relation therewith by means of solder or the like. The pressure responsive diaphragm 28 has a stud 30 fixedly attached to the center of its inner surface. The stud 30 extends through a hole 32 provided in the movement supporting plate 26.

The supporting plate 26 is further provided with an evacuation tube 34 extending therethrough and having an axially located hole 36 in communication with both the exterior and the interior of the case, through which the interior of the case is adapted to be suitably evacuated to a predetermined pressure.

An actuating mechanism or movement 38 is pivotly supported by an inverted U-shaped bracket 40 fixedly attached to the mechanism supporting plate 26 by screws 42. The bracket 40 is provided with a pair of downwardly extending side portions 44, each of which has a screw 46 threadedly mounted thereon and extending therethrough towards the space between said side members. Each screw 46 is provided with a reduced diameter portion 48 at its innermost end adapted to act as a pivotal support for the actuating mechanism 38. Each of the aforementioned screws 46, hereinafter referred to as pivot screws, is provided with a nut 50 screwed onto the outer end portion thereof in abutment with the respective downwardly extending sides 44 of the U-shaped bracket, for purposes of locking said pivot screws relative to said bracket.

The actuating mechanism 38 comprises a gear sector supporting bracket 52 having a pair of downwardly extending side portions each of which is provided with a hole 54 adapted to receive the innermost end 48 of the respective screws 46 and is thus pivotally mounted on said screws between the downwardly directed sides 44 of the U-shaped bracket 40. The sector supporting bracket has fixedly attached thereto, a gear sector 56. The gear sector 56 comprises a structure located in two planes, one vertical, and one substantially horizontal, the gear teeth being at the free edge of the horizontal portion of the sector, as shown in Fig. 4 for example. The teeth on the gear sector are in mesh with a pinion 58 rotatably supported on a plate 60 fixedly connected to the bight portion of the U-shaped bracket 40 and downwardly spaced therefrom. The pinion 58 further includes a shaft 62 that extends through the aforementioned bight, through a dial face 64 fixedly mounted on the bracket 40, and has at its uppermost end a dial pointer 66 fixedly attached thereto. The pinion 58 is provided with a position restoring coil spring 68 having one end thereof fixed to said pinion and the other end 70 thereof fixed to one of the downwardly extending sides 44 of the U-shaped bracket 40.

Referring again to the sector supporting bracket 52, it is pointed out the bracket is provided with a hole 72 extending through its transverse portion. The hole 72 receives a stud member 74 that is rotatably mounted therein in frictional relation therewith. The stud 74 has a hexagonal head portion 76 fixedly attached thereto, whereby it may be rotated in the hole 72. The stud 74 is provided with a hole 78 extending therethrough and having its axis offset from the center of the stud, whereby said stud in a sense is an eccentric. The aforementioned hole 78 in the stud is threaded and adapted to receive an adjusting screw 80, hereinafter referred to as a ranging screw. The screw 80 has a slot at its outermost end adapted to receive a screwdriver or the like, and a disk 82 at its innermost end and extending at right angles thereto. The edge of the disk 82 is adapted to contact the top surface of the stud 30 on the diaphragm 28.

Thus it can be seen, that the ranging screw 80 can be adjusted inwardly and outwardly of the sector supporting bracket 52 thereby varying the position of the disk 82 relative to the surface of the stud 30, whereby the ratio of movement between the pressure sensing diaphragm 28 and the indicating pointer 66 is adapted to be varied. More specifically, the further in the ranging screw 80 is moved, the less will be the pointer 66 movement for a given amount of movement of the pressure sensing diaphragm 28.

Figure 3:
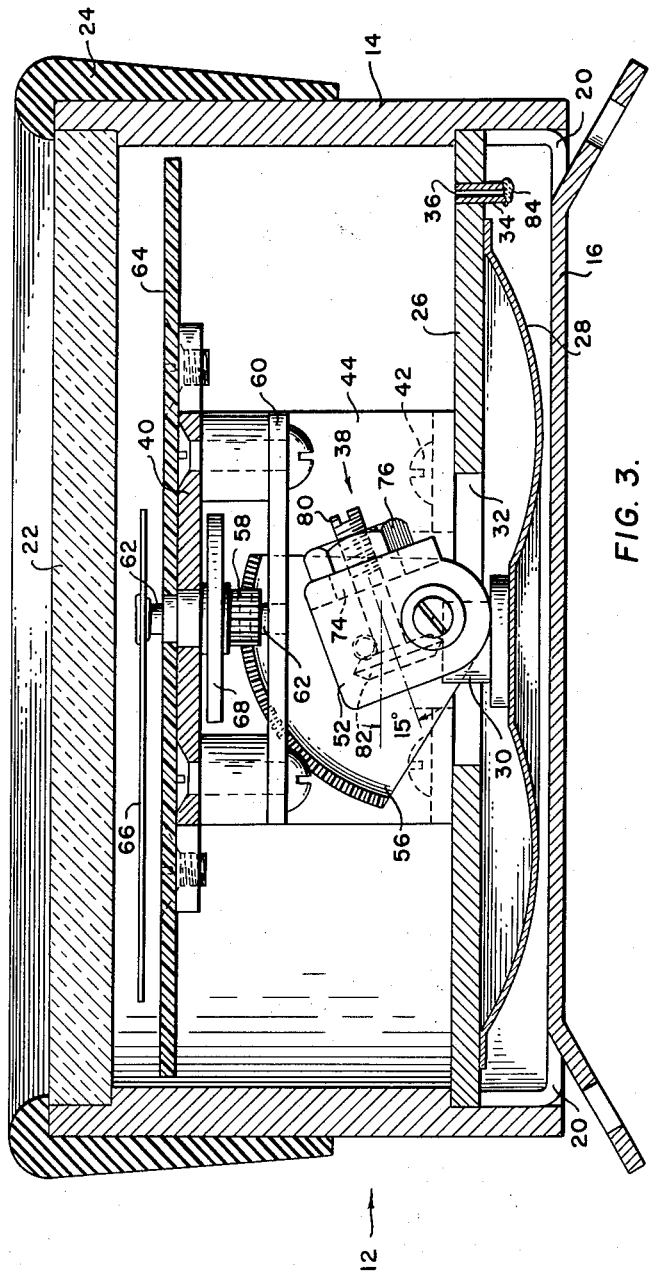
Fig. 3 is a transverse sectional view taken of line III—III of Fig. 2 showing the complete assembly.

It is pointed out that the elements of the instant invention are so proportioned that the response of the instant gauge is essentially linear with a linear increase in pressure on the diaphragm 28. This linearity is made possible by, among other things, the eccentric position of the ranging screw 80 relative to the stud or eccentric 74 in which it is mounted. When assembling and calibrating the instant device the stud or eccentric 74 is rotated until the contacting disk 82 at the inner end of the range screw 80 is so positioned in contact with the stud 30 on the diaphragm 28 that when there is zero pressure on the diaphragm, the axis of the range screw 80 is approximately 15° below horizontal, as shown in Fig. 3, whereas with maximum pressure on the diaphragm, and indicated on the dial 64, the axis of the range screw 80 will be at a position 15° above the horizontal. To be more exact, the range screw 80 is so adjusted, both by rotation of the eccentric 74 and by being screwed either inwardly or outwardly of said eccentric, that the angle of said screw with the horizontal is substantially the same, both at zero depth and at the maximum depth that the depth gauge is adatped to indicate. It is pointed out that the screw 80 is substantially horizontal when the depth gauge shows a mid-point reading.

The aforementioned actuating mechanism or movement 38 is suitably calibrated in a properly designed apparatus before being placed in the casing of the instant pressure gauge. The actuating mechanism 38 is so adjusted while in the specially designed calibrating apparatus (not shown), which essentially constitutes an air tight chamber, so that when the mechanism enclosing portion of the calibrating apparatus is evacuated to a pressure equal to approximately ⅔ of atmospheric pressure, the dial indicator 66 will point to zero feet on the dial face 64. The actuating mechanism 38 is then removed from the calibrating apparatus, and placed within the pressure gauge casing 14. All possible sources of air leakage either into or out of the casing 14, with the exception of the evacuation tube 34, are sealed airtight by use of solder or other suitable cementing agents. The casing is then evacuated through the tube 34 to a pressure equal to approximately ⅔ of atmospheric pressure which, as set forth above, will cause the dial indicator to point to zero. At this point the tube 34 is sealed airtight by solder or the like 84.

It is emphasized that the above described apparatus provides a depth pressure gauge adapted to be worn on the wrist, and having means whereby the calibration thereof may be adjusted both at the initial manufacture thereof and at subsequent dates should wear and tear cause the initial calibration to vary from its true value. The instant apparatus also provides a pressure gauge having little or no entrapped air in contact with its pressure sensing means 28, thereby eliminating the need for making temperature compensations as has been necessary in the prior art. It is also submitted that the instant invention is relatively simple in construction, especially the pressure sensing diaphragm 28 itself, which is in no way subject to fouling by foreign matter while in the water, as is the case with the conventional bellows and/or spiral tubular pressure sensing devices used in the prior art. In addition the instant pressure gauge is so constructed that, within its range, it is substantially linear in its response to linear changes in pressure thereon.

It should be understood, of course, the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A pressure gauge comprising, a casing member, a pressure indicating means including a pressure indicating dial face and a cooperating moveable dial pointer, a pressure responsive diaphragm affixed to said casing and adapted to flex in response to a pressure differential across its opposite surfaces, a pointer actuating means pivotally connected to said casing member, a cantilever member of adjustable length having one end mounted on said actuating means and having a free end in contact with a surface of said diaphragm, whereby movement of said diaphragm is communicated to said pointer through said actuating means; and moveable means for selectively adjusting the distance of the entire cantilever member from said diaphragm, said movable means comprising a rotatable stud having said cantilever member mounted thereon eccentrically of the axis of rotation of said stud.

2. A pressure gauge as set forth in claim 1, wherein said cantilever member is provided with a threaded portion threadedly mounted on said rotatable stud, whereby the length of said cantilever member is adapted to be varied, and the distance of the entire cantilever member from said diaphragm is rendered adjustable.

3. A pressure gauge comprising a casing member, a pressure responsive, flexible diaphragm mounted on the exterior of said casing member and adapted to move in response to changes of pressure on the exterior of said casing member, said diaphragm having one face thereof exposed to the interior of said casing member, said diaphragm also being mounted on said casing member in water and air impervious relation with the interior thereof, a pressure indicating dial face mounted within said casing, a pressure indicating pointer member having a shaft affixed thereto and pivotally connected to said dial face, a sector gear pivotally mounted within said casing member, an elongated screw member having one end thereof threadedly engaged with said sector gear, whereby the length thereof is adapted to be varied, another end of said screw member being in engagement with the interior of said diaphragm, whereby movement of said diaphragm causes rotation of said sector gear, said sector gear being in driving engagement with said pointer, and an adjusting means including a stud rotatably mounted on said sector gear and within which said one end of the screw member is threadedly mounted, eccentrically of the axis of rotation of said stud, whereby rotation of the stud makes possible the adjustment of the distance of the entire screw member from the interior face of the diaphragm.

References Cited in the file of this patent

UNITED STATES PATENTS

| | | |
|---|---|---|
| 62,083 | Stamp | Feb. 12, 1867 |
| 2,307,838 | Jacobsson | Jan. 12, 1943 |
| 2,560,237 | Miller | July 10, 1951 |
| 2,841,674 | Bourns et al. | July 1, 1958 |

FOREIGN PATENTS

| | | |
|---|---|---|
| 986,651 | France | Apr. 4, 1951 |